Aug. 24, 1965     D. W. KENNEDY     3,201,982

IN-VEHICLE DYNAMOMETER

Filed May 24, 1962     2 Sheets-Sheet 1

INVENTOR

Daniel W. Kennedy

Aug. 24, 1965  D. W. KENNEDY  3,201,982

IN-VEHICLE DYNAMOMETER

Filed May 24, 1962  2 Sheets-Sheet 2

INVENTOR
Daniel W. Kennedy

United States Patent Office 3,201,982
Patented Aug. 24, 1965

3,201,982
IN-VEHICLE DYNAMOMETER
Daniel W. Kennedy, 34248 Beachpark Ave.,
Eastlake, Ohio
Filed May 24, 1962, Ser. No. 197,541
3 Claims. (Cl. 73—136)

This invention relates to power and torque measuring devices, and in particular to dynamometers for use in automotive or aircraft vehicles.

In many phases of vehicular design and operation it is convenient and sometimes necessary that the power or torque produced by the prime mover of the vehicle be known. Present methods of measuring the output of vehicular engines require that rather heavy and expensive equipment be used to absorb the power being produced by the engine under evaluation. With some dynamometers, it is necessary to remove the prime mover from the vehicle and mount it securely to a stationary power absorption unit. Other dynamometers require only that the vehicle be placed in or on the power adsorption device. In either case, the method of absorbing and measuring power is cumbersome.

It is the object of this invention to provide an improved method for measuring the power or torque delivered by the prime mover of a vehicle while the prime mover remains mounted in the vehicle and the vehicle is under normal operating conditions.

It is obvious that under operating conditions the power of a vehicular prime mover is used to overcome the drag and/or inertial forces on the vehicle and the drive train. Thus, if these same drag and inertial forces act as the load for the prime mover, external dissipative devices need not be employed. It is required then, to measure the torque delivered by the prime mover, to measure the speed of the output shaft and, if desired, to multiply these two quantities to obtain the product which is proportional to the power delivered. Under typical operating conditions, the power might well be a rapidly varying quantity. If this is, indeed, the case, automatic computation of the power delivered is a desirable feature to enable the operator to monitor the output continuously and instantaneously.

The following description with accompanying drawings depicts two embodiments of the invention. In these drawings.

Figure 1:
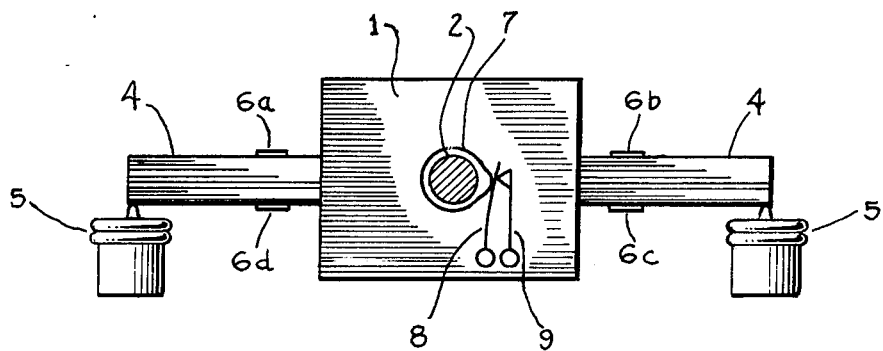
FIG. 1 is an elevation view of a flexurally supported prime mover showing a mount for the strain gage bridge and switch and in the description of the invention.

As illustrated in FIG. 1 a prime mover 1 with output shaft 2 is mounted to the frame 3 of a vehicle, via flexible arms 4 and shock cushions 5. Affixed to the flexible arms 4 are strain gages 6. Affixed to the output shaft 2 is a cam 7 which forces a movable contact 8 into electrical communication with another contact 9. Thus the contacts 8 and 9 are opened and closed at a rate proportional to the speed of the output shaft 2 and the strain gages 6 are strained at a rate proportional to the torque delivered by the prime mover 1. The strain gages 6 can be connected together in a bridge circuit so that the bridge output is insensitive to vertical or horizontal loading and sensitive only to torque.

Figure 2:
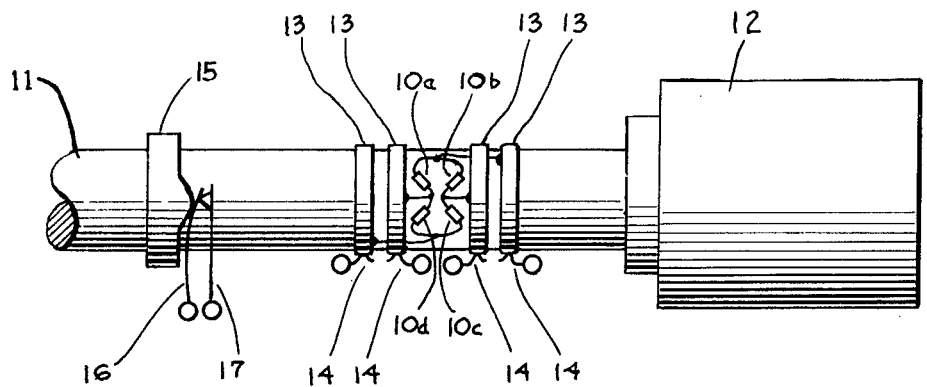
FIG. 2 is a view in elevation showing a strain gage bridge and switch on the shaft of the prime mover embodying the invention.

FIG. 2 illustrates another embodiment of the invention wherein the strain gages 10 are mounted to the output shaft 11 of the prime mover 12. The strain gages 10 are in turn serially connected and the electrical nodes are connected to slip rings 13 which are insulated from the output shaft 11 and which slide past brushes 14 to make the external connections. Also mounted to the output shaft 11 is a cam 15 which forces a movable contact 16 into another contact 17 at a rate proportional to the speed of the output shaft 11. The strain gages 10 are oriented such that when they are connected in a bridge circuit, the output of the bridge shall be porportional to the torque transmitted by the output shaft 11. The strain gage bridge thus formed produces the greatest output for a given torque when the strain gages are mounted at 45 degrees to the longitudinal axis of the output shaft 11.

Figure 3:
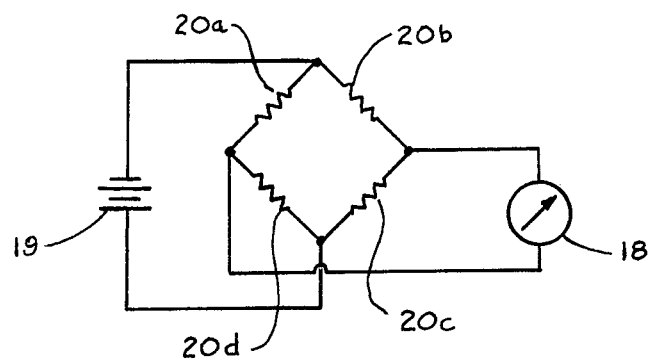
FIG. 3 is a circuit diagram for a torque indicator.

FIG. 3 illustrates a circuit which will give an indication on the current meter 18 proportional to the torque applied by the prime mover 1, 12. It comprises a source of electromotive potential 19 to power the bridge circuit formed by the four strain gages 20. The letters following the numbers identifying each set of strain gages 6, 10 and 20, indicate the relative position of each strain gage in its physical placement and in the circuitry.

Figure 4:
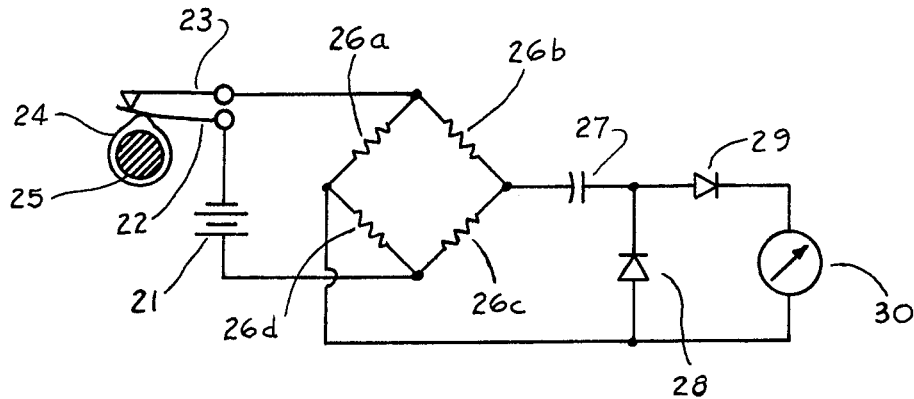
FIG. 4 is a circuit diagram for a power indicator.

FIG. 4 illustrates a circuit for computing the power delivered by a prime mover 1, 12 when a measure of the output shaft 2, 11, 25 speed and a measure of the torque are available in the prescribed forms. The circuit comprises a source of electromotive potential 21 which is interrupted by a pair of contacts 22, 23 which are driven by a cam 24 affixed to the output shaft 25 of the prime mover of interest. The interrupted potential source thus formed is connected to a bridge circuit composed of four strain gages 26 whose orientation is prescribed by matching the succeeding letters to those in FIGS. 1 and 2. In addition, the circuit contains a capacitor 27 connected to the positive terminal of a diode 28 and connected to the negative terminal of a diode 29 and a current meter 30 the average current though which will be proportional to the power delivered by the prime mover.

The operation of FIG. 4 is considered in more detail in the following paragraphs. From the brief explanation given in the preceding paragraph it is seen that the strain gage bridge 26 is powered by a source, the frequency of which is proportional to the output shaft 25 speed, the amplitude of which is constant and the duty cycle of which is constant and is determined by the contour of the breaker cam 24. Here, the duty cycle is defined as the percentage of time the contacts are closed and is typically 50%. The strain gage bridge 26 elements $a$, $b$, $c$, and $d$ are physically oriented on shaft 25 to correspond to the elements of bridges 6, 10 in FIGS. 1 and 2. It is observed that the average power supplied to the strain gage bridge 26 is constant and independent of the shaft 25 speed. The thermal time constant of the strain gages is long compared to the period of the lowest frequency of excitation (on the order of 5 to 1) so that the temperature of the strain gages remains virtually constant and special precautions to render the strain gages insensitive to temperature variations are obviated. As is well known, a strain gage bridge undergoing temperature variations may become unbalanced and lead to false output voltages and consequent system inaccuracies.

The remainder of the circuit of FIG. 4 consists of a capacitor, 27, two diodes 28, 29 and a current meter, 30. Typical operation of the circuit begins with closure of the contacts 23. A current will then flow through the output terminals of the strain gage bridge so as to charge the capacitor 27 through the diode 28. For the moment, assume that complete charging of the capacitor occurs and the flow of current ceases. At this instant, the voltage across the capacitor 27 equals the voltage at the output of the bridge. This voltage is directly proportional to the strain experienced by the strain gages and is given by:

$$E_O = EKs$$

where $E_O$ is the output voltage, E is the battery voltage 21, s is the strain experienced by the strain gages and K is the gage factor of the strain gages.

The next phase of the circuit operation begins when the contacts 23 are interrupted. With this loss of electrical potential, the capacitor can no longer remain charged and it thus beings to discharge. But the direction of current flow is now opposite to that of the charging current and diode 29 now allows passage of the current through the current meter 30. By a well known characteristic of capacitors, the stored charge of the capacitor is:

$$q = CE_O$$

where q is the charge in coulombs. This charge, q, passes through the current meter 30 if the capacitor discharges completely. So far, we have assumed complete charging and discharging of the capacitor. In theory, this can never happen as the current in a resistance-capacitance network is of exponential form and given by:

$$i = \frac{E_O}{R_{eq}} e^{-\left(\frac{t}{R_{eq}C}\right)}$$

for the case of discharging a capacitor C from $E_O$ volts to zero volts through an equivalent resistance $R_{eq}$. In this equation, t is time in seconds, i is current in amperes, and e is the naperian base. In this equation $R_{eq}C$ has the dimension seconds and is defined as the time constant of the charging circuit. If one allows a period of three time constants, the charging will be 95% complete; 99% for five time constants and so on. Hence, we can expect an accuracy of about 1% if the charging and discharging times are at least five time constants under conditions of operation corresponding to the highest speed of shaft 25.

The time constant of the charging circuit of FIG. 4 is given by the output impedance of the bridge (which is equal to the resistance of one arm if all four arms are equal) and the capacitance of 27. The discharge time constant is given by the bridge output impedance in series with the internal resistance of the meter and combined with the capacitance of 27. Thus, the period of excitation frequency must always be great enough to allow the desired percentage of charging and discharging.

The current passing through the meter, 30, will then be the average current discharged by the capacitor, 27, and is given by:

$$i_{meter} = nCE_O$$

where the meter current is in amperes, n is the number of times per second that discharging occurs, C is the value of the capacitor in farads and $E_O$ is the open circuit bridge output voltage.

It is now clear from the preceding equation that the meter current is indeed proportional to the product of shaft speed and shaft torque. The meter 30 is a conventional direct current meter typically having 0.100 milliampere full scale reading and 500 ohms resistance. Such a meter will have unnoticeable flutter when the capacitor discharges through it at least 30 or 40 times per second. Therefore shaft 25 must rotate at 30 to 40 revolutions per second at the lowest speed at which the apparatus of FIG. 4 is to be used or alternatively cam 24 must be designed to cause contacts 23, 24 to open and close more than once per revolution if lower shaft speeds are to be used.

The two embodiments of the invention described above are to be considered only as typical arrangements and should in no way limit the scope of the invention.

What I claim is:

1. A dynamometer, the power of a prime mover to be measured by said dynamometer, said dynamometer comprising in combination, a pair of flexural supports to carry the vertical and horizontal components of the prime mover weight and acceleration and prime mover torque reaction, a pair of serially connected variable impedance elements responsive to variations in mechanical stress mounted on each of said supports and contacting said supports to acquire a variation in stress in proportion to the torque applied by the prime mover whereby the impedances of said elements are also varied, said elements connected to provide an electrical bridge circuit, a switch means driven by the output shaft of said prime mover at a rate proportional to shaft speed, said switch means connected to alternately connect and disconnect a source of constant electrical voltage to two opposite nodes of said bridge circuit, a capacitor, a first diode and a current meter serially connected in the stated order between one of the remaining nodes of said bridge circuit and the other remaining node, said first diode conducting current from said capacitor to said meter, a second diode connected between said other remaining node and the common connection point of said capacitor and said first diode, said second diode conducting current toward said common connection point, the average current through said meter being proportional to the power delivered by said prime mover.

2. Apparatus for measuring the power of a machine having a rotating shaft comprising a strain gage bridge attached to said machine to measure strain in a member thereof, means for applying a constant electrical input voltage to the input terminals of said bridge, said electrical voltage means having a frequency related to the rotational velocity of the shaft of said machine, means for detecting the output of said bridge, said output means being responsive to the frequency of said input voltage means and to strain-induced bridge unbalance whereby the power of said machine is determined.

3. Apparatus for measuring the power of a machine having a rotating shaft connected thereto comprising a resistance bridge network, at least one arm of said network being an element whose resistance varies with strain, said arm being attached to said machine to be responsive to the strain induced therein, means for applying a constant input voltage of frequency proportional to shaft speed to oppose terminals of said bridge, means for detecting the output signal of said bridge at its output terminals, said detecting means being responsive to the frequency of said signal and resistance unbalance of said bridge to provide the power output or input of said machine.

References Cited by the Examiner

UNITED STATES PATENTS

| 2,392,293 | 1/46 | Ruge | 73—136 |
|---|---|---|---|
| 2,845,795 | 8/58 | Emmerling | 73—136 |
| 2,916,914 | 12/59 | Graves et al. | 73—114 |
| 2,949,029 | 8/60 | Bayles et al. | 73—136 |

FOREIGN PATENTS

| 889,563 | 10/43 | France. |
|---|---|---|
| 885,617 | 7/60 | Great Britain. |

OTHER REFERENCES

German Application 1,120,755 (Phillips), December 1961.

RICHARD C. QUEISSER, *Primary Examiner.*

JOSEPH P. STRIZAK, *Examiner.*